US009657725B2

(12) United States Patent
Berl (10) Patent No.: US 9,657,725 B2
(45) Date of Patent: May 23, 2017

(54) ION THRUSTER

(71) Applicant: Gil Berl, Kiryat Bialik (IL)

(72) Inventor: Gil Berl, Kiryat Bialik (IL)

( * ) Notice: Subject to any disclaimer, the term of this patent is extended or adjusted under 35 U.S.C. 154(b) by 116 days.

(21) Appl. No.: 14/628,254

(22) Filed: Feb. 22, 2015

(65) Prior Publication Data

US 2015/0240794 A1    Aug. 27, 2015

(30) Foreign Application Priority Data

Feb. 23, 2014    (IL) .......................... 231085

(51) Int. Cl.
*F03H 1/00*        (2006.01)
(52) U.S. Cl.
CPC ......... *F03H 1/0081* (2013.01); *F03H 1/0037* (2013.01); *F03H 1/0043* (2013.01); *F03H 1/0056* (2013.01)
(58) Field of Classification Search
CPC .............................................. F03H 1/00–99/00
See application file for complete search history.

(56) References Cited

U.S. PATENT DOCUMENTS

| 3,412,559 | A |   | 11/1968 | Sohl |  |
|---|---|---|---|---|---|
| 3,620,018 | A |   | 11/1971 | Banks |  |
| 4,825,646 | A |   | 5/1989 | Challoner |  |
| 4,937,456 | A | * | 6/1990 | Grim | F03H 1/0043 219/121.48 |
| 5,689,950 | A |   | 11/1997 | Smith |  |
| 7,581,380 | B2 |   | 9/2009 | Wahl |  |
| 2006/0283171 | A1 | * | 12/2006 | Metcalfe, III | F03H 1/00 60/202 |
| 2012/0167548 | A1 | * | 7/2012 | Knoll | F03H 1/0056 60/203.1 |

OTHER PUBLICATIONS

Orbital ATK "Pegasus", 2016.*
Aversano "The History of the Rocket-Powered Motorcycle", 2016.*
https://en.wikipedia.org/wiki/Ionocraft.

* cited by examiner

*Primary Examiner* — Phutthiwat Wongwian
*Assistant Examiner* — William Breazeal
(74) *Attorney, Agent, or Firm* — Daniel J. Swirsky; AlphaPatent Associates Ltd.

(57) ABSTRACT

An ion thruster, comprising: a discharge chamber for accelerating ions towards one direction; an inflow opening for intake of a propellant into the discharge chamber; a discharge cathode, shaped in a form of a propeller, for releasing electrons in the discharge chamber, thereby ionizing the propellant in the discharge chamber, wherein the discharge cathode is rotatable around an axis, thereby propelling inward to the discharge chamber the propellant thereof; an outflow opening for exhausting the ions from the discharge chamber; and an accelerator electrode, shaped in a form of a propeller, for accelerating the ions towards the one direction of the outflow opening, wherein the accelerator electrode is rotatable around an axis, thereby propelling outward from the discharge chamber the ions and neutral atoms thereof; wherein the ion thruster comprises electromagnetic coils for generating a magnetic field inside the discharge chamber.

11 Claims, 8 Drawing Sheets

ION THRUSTER

This application claims the benefit of priority from Israel Patent Application No. 231085, filed 23 Feb. 2014, the disclosure of which is incorporated herein by reference.

TECHNICAL FIELD

The invention relates to the field of ion thrusters. More particularly, the invention relates to an improved and accelerated ion thruster.

BACKGROUND

An ion thruster is a form of electric propulsion used for spacecraft propulsion that creates thrust by accelerating ions. The term is used to refer to gridded ion thrusters, but may often be applied to all electric propulsion systems that accelerate plasma (electrically neutral medium of positive and negative particles), since plasma consists of ions. Ion thrusters are categorized by how they accelerate the ions, using either electrostatic or electromagnetic force. Electrostatic ion thrusters use the Coulomb force (the electric field vector at that point) and accelerate the ions in the direction of the electric field. Electromagnetic ion thrusters use the Lorentz force (the combination of electric and magnetic force on a point charge due to electromagnetic fields) to accelerate the ions.

Ion thrusters use beams of ions (electrically charged atoms or molecules) to create thrust in accordance with momentum conservation. The method of accelerating the ions varies, but all designs take advantage of the charge/mass ratio of the ions. This ratio means that relatively small potential differences can create very high exhaust velocities. This reduces the amount of reaction mass or fuel required, but increases the amount of specific power required, compared to chemical rockets. Ion thrusters are therefore able to achieve extremely high specific impulses. The drawback of the low thrust is low spacecraft acceleration, because the mass of current electric power units is directly correlated with the amount of power given. This low thrust makes ion thrusters unsuited for launching spacecraft into orbit, but ideal for in-space propulsion applications.

The applications of ion thrusters include control of the orientation and position of orbiting satellites (some satellites have dozens of low-power ion thrusters), and they are used as a main propulsion engine for low-mass space vehicles (for example, "Deep Space 1", and "Dawn").

Various ion thrusters have been designed, and they all generally fall under two categories: electrostatic or electromagnetic. The main difference is how the ions are accelerated. Electrostatic ion thrusters use the Coulomb force, and are categorized as accelerating the ions in the direction of the electric field. Electromagnetic ion thrusters use the Lorentz force to accelerate the ions.

Power supplies for ion thrusters may be solar panels, but at sufficiently large distances from the sun, other power sources may be used. In such cases, the power supply mass is essentially proportional to the peak power that can be supplied, and they both essentially give, for this application, no limit to the energy. Electric thrusters tend to produce low thrust, which results in low acceleration. Using $g_0$ as 9.81 m/s$^2$; "F=m a"; or "a=F/m" (where "F" stands for force, "m" for mass, and "a" for acceleration), a thruster producing a thrust (=force) of 92 mN will accelerate a satellite with a mass of 1,000 kg by 0.092/1,000=0.000092 m/s$^2$.

NASA (National Aeronautics and Space Administration) has used ion thrusters in its spacecrafts. For example, the NASA Solar electric propulsion Technology Application Readiness (NSTAR), with 2.3 kW was used on two successful missions. Or, to give another example: NASA's Evolutionary Xenon Thruster (NEXT), with a 6.9 kW ion thruster.

NASA's ion thruster NSTAR program provided the technology used on the "Deep Space 1" spacecraft. The NSTAR 30 cm ion thruster operates over a 0.5 kW to 2.3 kW input power range, providing thrust from 19 mN to 92 mN. The specific impulse ranges from 1,900 s at 0.5 kW to 3,100 s at 2.3 kW.

Due to the relatively high power needs of ion thrusters, the specific power of their power supplies, and the requirement for an environment void of other ionized particles, the general use of ion thrust propulsion is currently only practical in space.

All the methods described above have not yet provided satisfactory solutions to the problem of increasing the thrust power of ion thrusters.

In one aspect of the invention, the invention provides an ion thruster that can be operated within the earth's atmosphere.

In another aspect of the invention, the invention provides an ion thruster that is efficient to power a vehicle within the earth's atmosphere.

In another aspect of the invention, the invention provides an ion thruster that is practical for use as the engine for powering vehicles on the surface of the earth.

In another aspect of the invention, the invention provides an ion thruster with a propeller for increasing the resulting thrust.

In another aspect of the invention, the invention provides a solution to the above-mentioned and other problems of the prior art.

Other aspects of the invention will become apparent as the description proceeds.

SUMMARY

In one aspect, the invention is directed to an ion thruster, comprising:
- a discharge chamber for accelerating ions towards one direction;
- an inflow opening for intake of a propellant into the discharge chamber;
- a discharge cathode, shaped in a form of a propeller, for releasing electrons in the discharge chamber, thereby ionizing the propellant in the discharge chamber, wherein the discharge cathode is rotatable around an axis, thereby propelling inward to the discharge chamber the propellant thereof;
- an outflow opening for exhausting the ions from the discharge chamber; and
- an accelerator electrode, shaped in a form of a propeller, for accelerating the ions towards the one direction of the outflow opening, wherein the accelerator electrode is rotatable around an axis, thereby propelling outward from the discharge chamber the ions and neutral atoms thereof;
- wherein the ion thruster comprises electromagnetic coils for generating a magnetic field inside the discharge chamber, wherein the electromagnetic coils are wound around the discharge chamber, thereby the electromagnetic coils enhance the degree of ionization and increase the acceleration rate of the ions inside the discharge chamber thereof; thereby accelerating the ions inside the discharge chamber for creating a thrust.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments, features, and aspects of the invention are described herein in conjunction with the following drawings.

It should be understood that the drawings are not necessarily drawn to scale.

DETAILED DESCRIPTION

The invention will be understood from the following detailed description of embodiments, which are meant to be descriptive and not limiting. For the sake of brevity, some well-known features, methods, systems, procedures, components, circuits, and so on, are not described in detail.

According to one embodiment of the invention, an improved ion thruster is provided for accelerating ions to high exhaust velocities to create thrust sufficient for powering vehicles such as cars or motorcycles for use on roads. The improved structure of the ion thruster according to the invention produces an increased thrust sufficient to power vehicles for road drives, and to improve engines of satellites and spacecrafts with the intention to provide them with more powerful engines allowing an improved thrust for long-distance space travels at increased velocities.

Figure 1:
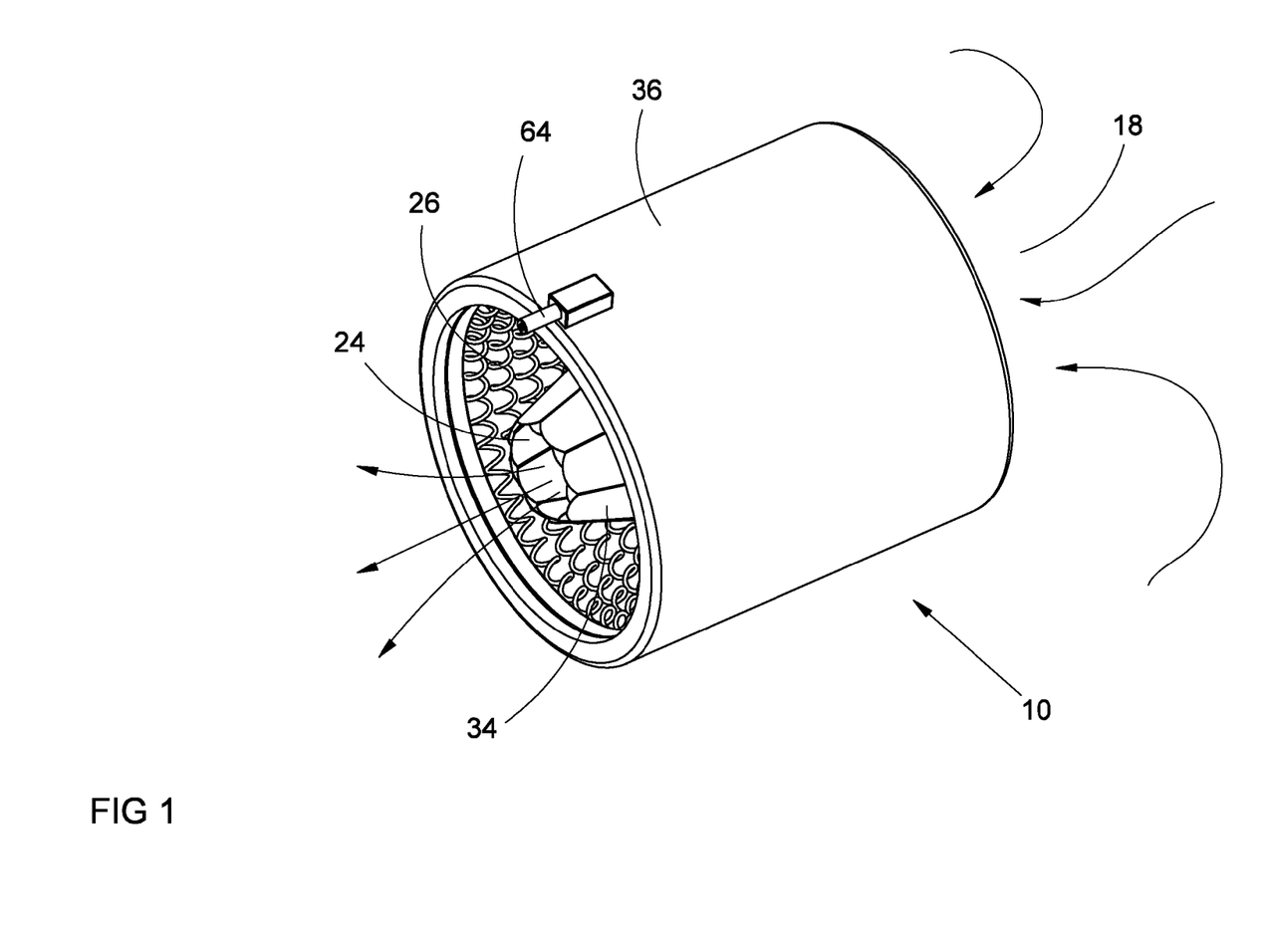
FIG. 1 is a schematic illustration of an ion thruster, according to one embodiment of the invention.

FIG. 1 is a schematic illustration of an ion thruster, according to one embodiment of the invention.

According to this embodiment of the invention, envelope 36 is formed in the shape of a cylinder, and is used as the case and chassis of ion thruster 10. A discharge chamber 34 is used for confining a cavity for accelerating ions in one direction, and for directing an ion beam towards a defined thrust vector. A wide inflow opening 18 allows the entrance of gas (used as a propellant) or air into the inner cavity of discharge chamber 34, and a narrower outflow opening 24 allows for the outflow of accelerated ions to create thrust. According to the invention, the gas used as a propellant may be selected from the group consisting of: xenon, argon, hydrogen, ammonia, nitrogen, and bismuth. Alternatively, the propellant gas may be regular atmospheric air, inserted into inflow opening 18 of discharge chamber 34. Air may be compressed into inflow opening 18 by a device such as a compressor (not shown), to increase the air density inside discharge chamber 34 and to allow an increased airflow in discharge chamber 34 in the direction towards outflow opening 24. In the case wherein the propellant gas is regular atmospheric air, by the use of a compressor to compress air into inflow opening 18, the advantage of compressed air is that the additional quantity of propellant gas to be used for ionization is thus increasing the quantity of charged ions to create a greater thrust potential, in addition to the pressure created by the inflow of air. By using condensed air, the relative number of air molecules at a given discharge chamber increases, resulting in an increase in the number of accelerated ions at chamber 34 for creating an enhanced thrust of ion thruster 10. The compressed propellant gas (or compressed air) may be provided from gas cylinder 70 (shown in FIGS. 4, 6, and 7), connected with inflow opening 18 for inflowing the propellant at high pressure into discharge chamber 34, thereby creating high propellant pressure inside discharge chamber 34. Afterwards, by the ionization of the compressed propellant inside discharge chamber 34, a greater mass of ions is earned, which is thereafter translated into greater thrust by accelerating that greater mass of ions inside discharge chamber 34.

According to one embodiment of the invention, electromagnetic coils 26 are wound around the inner surface of envelope 36 to create an electromagnet. When electricity is passed through coils 26, it generates a magnetic field. Electromagnetic coils 26 may be coated with varnish or may be wrapped with insulating tape to provide additional insulation and secure them in place. Electromagnetic coils 26 generate a magnetic field inside discharge chamber 34, and the operation of that magnetic field enhances ionization efficiency.

Moreover, according to a further embodiment of the invention, coils 26 transmit electromagnetic waves directed to accelerate the ions of the propellant gas towards the direction of outflow opening 24.

According to one embodiment of the invention, after the intake of a propellant from inflow opening 18, the atoms or molecules of the propellant are to be ionized by the insertion of electrons into discharge chamber 34.

Figure 4:
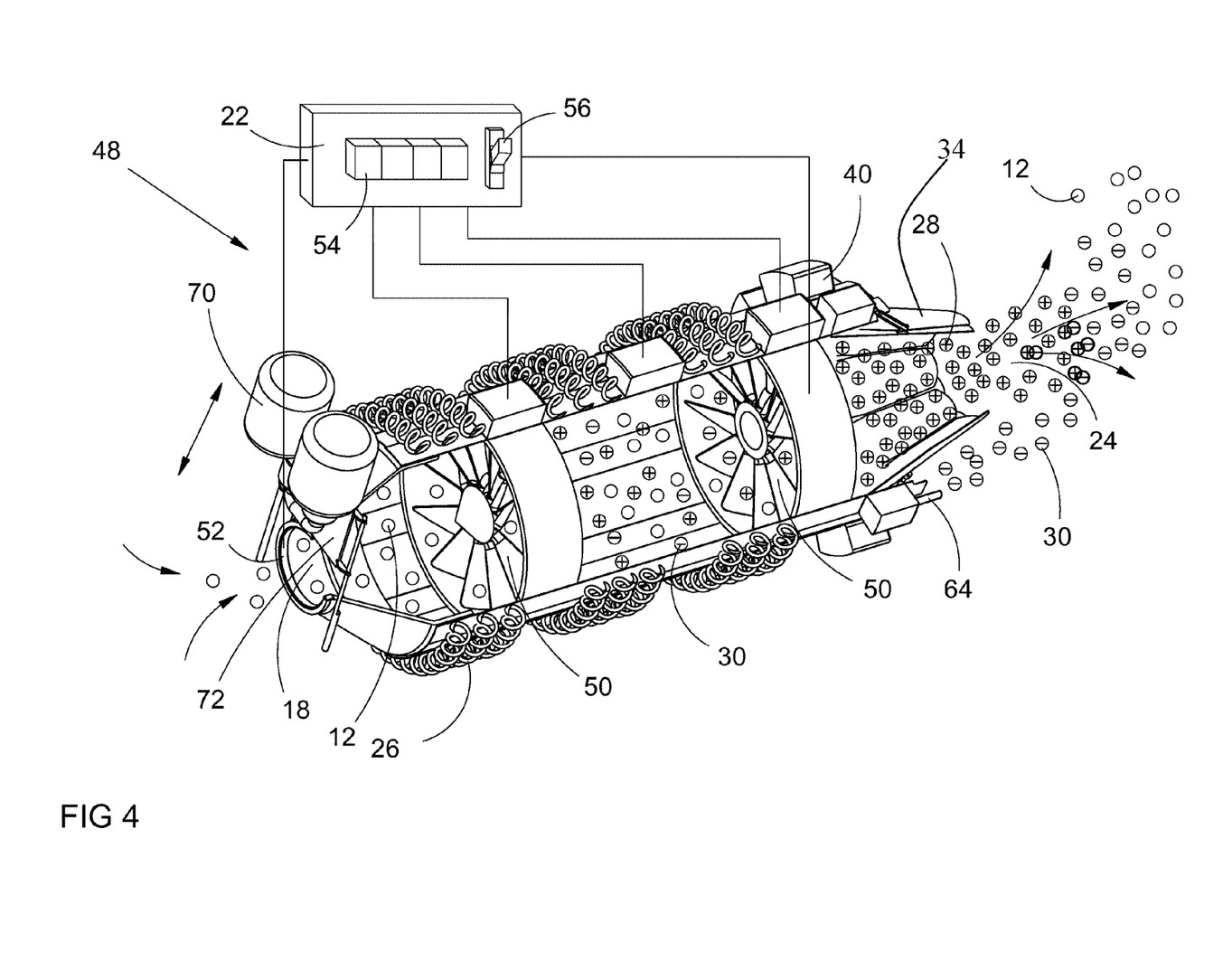
FIG. 4 is a schematic illustration of a cross-section of an ion thruster, according to another embodiment of the invention.

According to one embodiment of the invention, after the atoms inside discharge chamber 34 have ionized, the ions are accelerated in the direction towards outflow opening 24, by electrodes (shown in FIG. 4). An electrode (in the form of a propeller in FIG. 4), accelerates the positive charged ions through the electrostatic attraction of the accelerator electrode.

Neutralizer 64 releases electrons to the outer atmosphere surrounding outflow opening 24. The released electrons from neutralizer 64 conjugate with the positively charged ions flowing out from outflow opening 24 ("the rear side") of ion thruster 10. As a result of a conjunction of the negatively charged electrons 30 (shown in FIG. 4) released from neutralizer 64 with the positively charged ions 28 (also shown in FIG. 4) flowing from outflow opening 24, and as a direct result from the attraction between negatively charged electrons and positively charged ions, the outflow of the charged ions returns to the neutral state of uncharged atoms (shown as atoms 12 in FIG. 4). The importance of using neutralizer 64 for neutralizing the outflow beam of ions from outflow opening 24 of ion thruster 10 is twofold:

(a) by neutralizing the outflow of ions, positively charged ions will not charge envelope 36 of ion thruster 10, or the body of a vehicle (such as a spacecraft, for example); the prevention of such an unwanted charging is also important for safety reasons, as the discharge may be lethal, should a human touch the charged body; and (b) neutralizing the accelerated outflow of ions is essential for allowing the creation of thrust; if the positively charged accelerated ions are not neutralized, then a backward motion of ions will be the result of the attraction of accelerator electrode 14, 16, or 50 (shown in FIGS. 2, 4, and 5); if a neutralizer 64 is not used, then a great loss of thrust will be the result of the opposing direction of flow, as un-neutralized ions will flow backwards in the direction of outflow opening 24 (because of the attraction of the negatively charged accelerator electrode).

Figure 2:
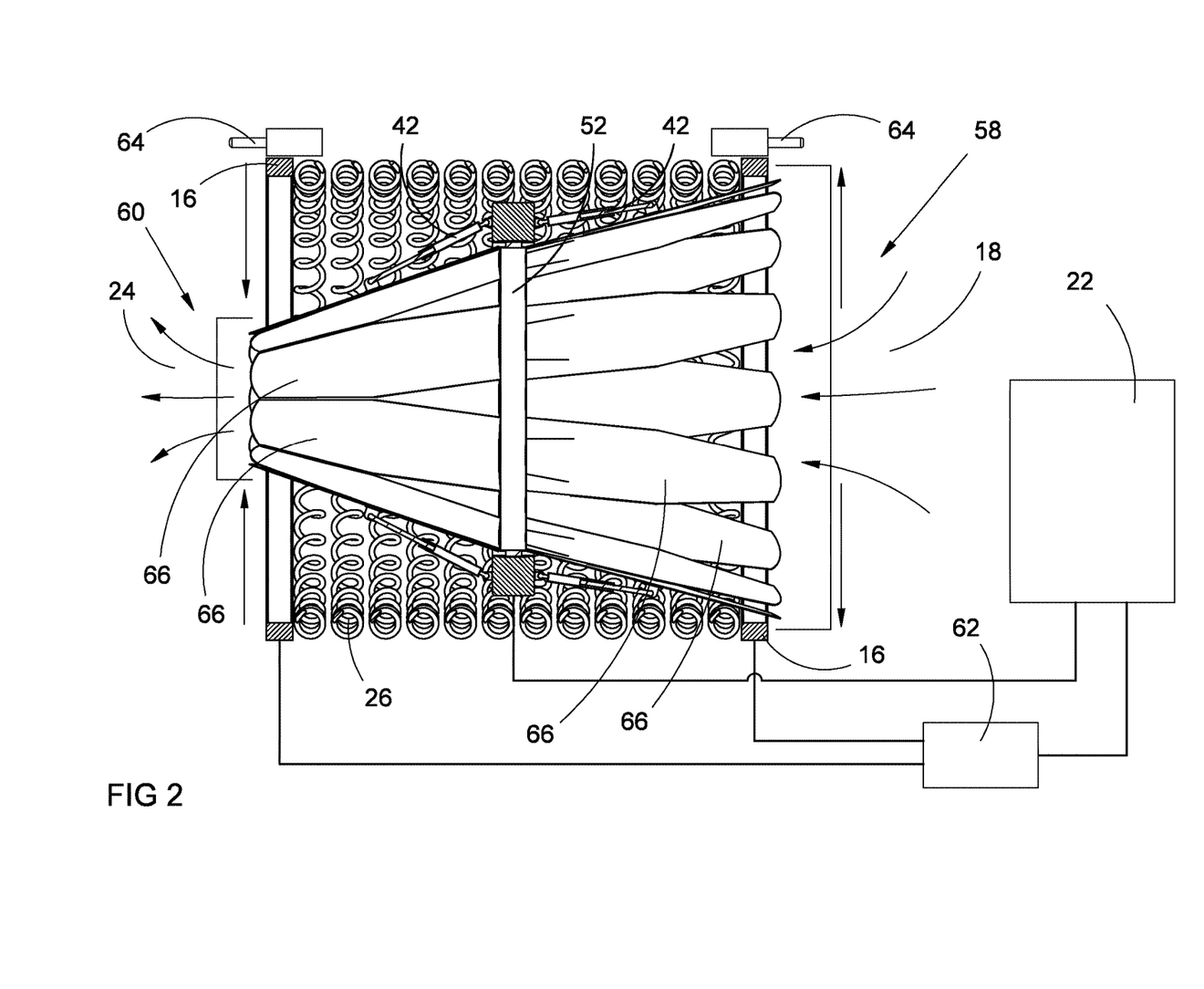
FIG. 2 is a schematic illustration of an ion thruster with a changeable chamber form, according to one embodiment of the invention.

FIG. 2 is a schematic illustration of an ion thruster with a changeable chamber form, according to one embodiment of the invention.

According to one embodiment of the invention, an ion thruster has a discharge chamber with a changeable form, for enhancing ionization and acceleration of ions. Discharge chamber 34 is made from a plurality of conductive beams 66, all of which are coupled longitudinally to form a barrel-shaped chamber. The resulting structure of the barrel-like shape can be changed by opening or closing metallic beams 66 with an automated mechanism for choosing the desired angles for the barrel walls. By affecting the motion of the conductive metallic beams forming the barrel-like shape of discharge chamber 34, the respected shape of discharge chamber 34 is made changeable in accordance with the dynamic angles of conductive beams 66 as they are opened or closed, to allow for the preferred shape of discharge chamber 34 at a given state of operation for increasing the thrust of the produced propagated ion beam, by optimizing the ionization efficiency of the propellant gas and creating a powerful electromagnetic field.

By determining the angles of metallic beams 66 to form the shape of chamber 34, the resultant electromagnetic field can be decided and changed while changing the shape of the barrel-like structure of discharge chamber 34. In this way, a control mechanism may be utilized to change the shape of chamber 34 according to the energetic stage and power load of ion thruster 10. If a more intensive work is required, a change in the shape of discharge chamber 34 is achieved by a movement of conductive beams 66 elements, thus creating an altered magnetic field. A recorded data of conductive beams 66 positions and the correlative shapes of chamber 34 are stored at a database, and an automatic control mechanism may be used to control the positions of conductive beams 66, based on an algorithm that is giving a position for each output power level of thrust.

Electromagnetic coils 26 create a magnetic field to enhance the ionization efficiency. A high ionization level is needed to enhance the ionization of the propellant gas, as the effect of a collision between the neutral gas molecules and the released electrons is not sufficient to ensure that all the propellant molecules will be ionized. A magnetic field can also be used according to the invention to create waves in the ionized discharge plasma, and the creation of an electromagnetic wave such as a helicon can dramatically improve the thrust of the ionized propellant. A helicon is a low frequency electromagnetic wave that can exist in plasmas in the presence of a magnetic field, and by activating electromagnetic coils 26, a magnetic field can be employed to amplify the acceleration of ions in the presence of a helicon.

According to another embodiment of the invention, a functional significance of a conic structure of discharge chamber 34 is related to the enhancement of the electromagnetic field inside discharge chamber 34, for assisting with the acceleration of ions. As a result of a discharge chamber 34 structure in the shape of a cone, a gradual intensity in the force of the field on the ions occurs as the ions advance towards the narrow side of the cone. At the narrow side of the cone, a stronger electromagnetic field is activated, as a result of focusing the field at a smaller area, and in this way, an increased operation of acceleration occurs simultaneously with the motion of an accelerated ion along its motion towards accelerator electrode 16. Therefore, the increase in power of the electromagnetic field along the line of motion of an ion towards the narrower side of the conic structure of discharge chamber 34, results in an increase in the acceleration of that ion.

Power source 22 supplies the energy needed to accelerate the ions. Power source 22 may be a battery such as: nickel-cadmium (NiCd), lithium-ion (Li-ion), nickel-zinc (NiZn), zinc-carbon batteries, alkaline batteries, rechargeable batteries, and so on. Control 62 is connected to power source 22, to allow operating and switching of electrodes 16. Upon activation of an electrode 16 (in FIG. 2, the activation of electrode 16 that is placed next to the outflow opening 24, shown here at the left side of FIG. 2), the positive ionized atoms are attracted to the negative charge of electrode 16, thereby causing the ions to accelerate towards the electrode. The resulting acceleration of ions inside the discharge chamber creates the thrust and throws the ions outside outflow opening 24 at the contracted side 60 of ion thruster 10. In this way, the thrust created by the accelerated motion of ions towards the left side in FIG. 2, creates a force operated in the direction towards the right side in FIG. 2, in accordance with the mechanical law which determines that when a system accelerates a mass in one direction, the accelerated mass will cause a force of equal magnitude but in an opposite direction on that system. Therefore, in accordance with the quantitative mechanical law of "F=m a", where "m" equals the total mass of the ions and "a" to the acceleration of the ions, the resulting force "F" operates on the ion thruster in the direction of wider side 58 of ion thruster 10 (here towards the right side in FIG. 2).

According to one embodiment of the invention, pistons 42 are connected to ring 52 (placed across the middle of ion thruster 10) from one side, and to contractive beams 66 from the other side. The opening and closing movement of pistons 42 is moving contractive beams 66 respectively. By controlling the angles of contractive beams 66, the formed conic shape of discharge chamber 34 can be decided and changed accordingly, as chosen. Deciding the slope of the lateral surface of the conic shape of discharge chamber 34 defines the resulting magnetic field created inside discharge chamber 34 by the electric induction of contractive beams 66. Increasing or decreasing the slope of the surface of conic discharge chamber 34 by opening or closing pistons 42 determines the magnitude of the magnetic field inside discharge chamber 34, and hence the power level of thrust of ion thruster 10.

Neutralizer 64 is directed to neutralize the charge of ions as they exit from outflow opening 24, in order to avoid the charging of the outer envelope 36 (shown in FIG. 1) of ion thruster 10 or the return of charged ions 28 into discharge chamber 34.

Figure 3:
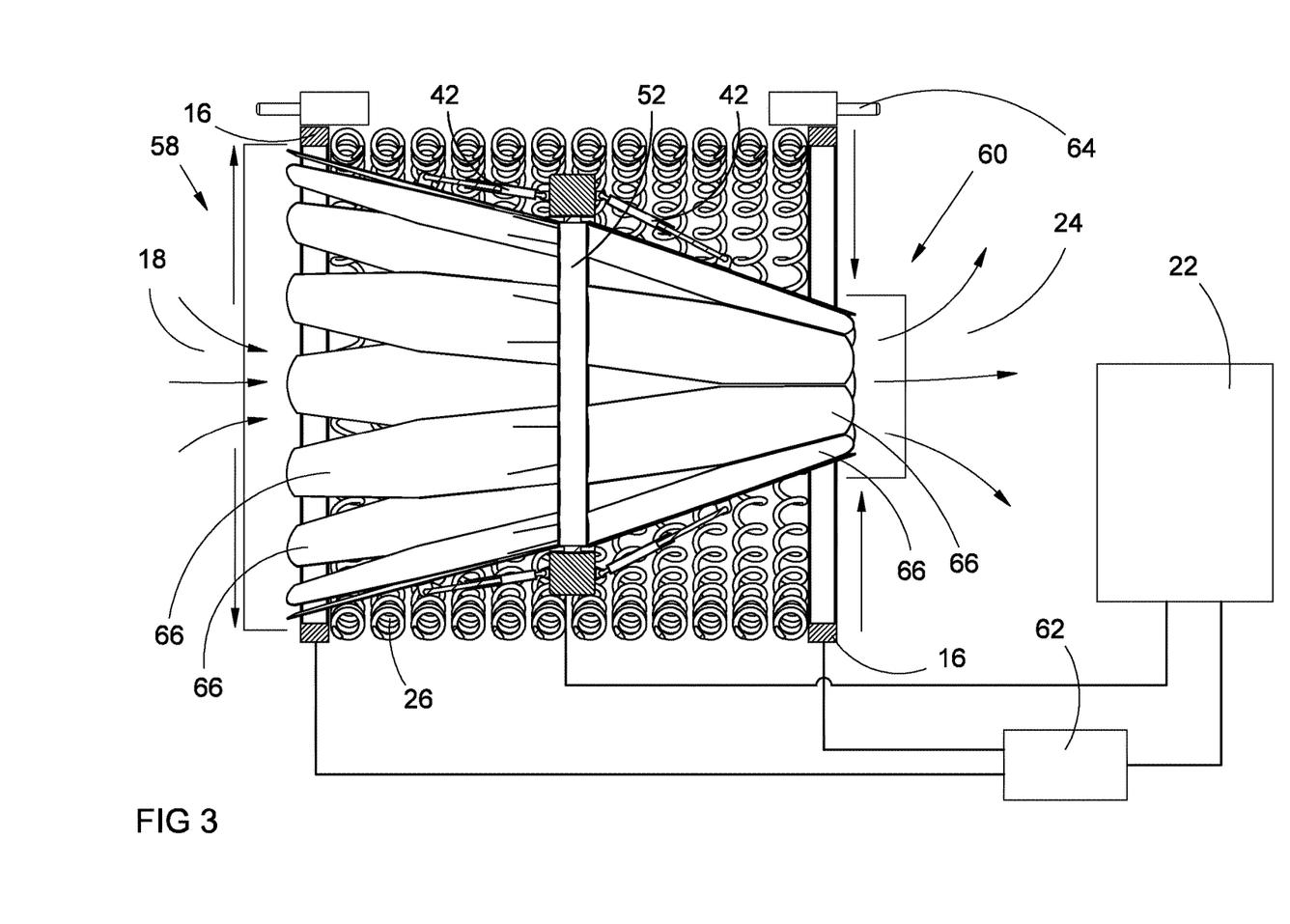
FIG. 3 is a schematic illustration of an ion thruster with a changeable chamber form, according to one embodiment of the invention.

FIG. 3 is a schematic illustration of an ion thruster with a changeable chamber form, according to one embodiment of the invention.

According to this embodiment, the shape of ion thruster 10 is dynamically changed by the position of conductive beams 66. The direction of the ion thruster may thus be changed, as the angle of conductive beams 66 passes the horizontal angle.

The change in the direction of thrust in the ion thruster according to the invention may be used when a vehicle that moves at a high velocity is to be stopped. For example, a spacecraft that is designed and used for long distance space travels and is flying in a precise direction, may need to slow down its velocity or be stopped completely when reaching its destination (which may be a coordinate at space). In this case, it is preferred to keep the spacecraft on the same course, while slowing down its movement (to a complete standstill if needed). A 180 degrees shift in the direction of thrust is to keep the same course of movement of a spacecraft, influencing only the velocity. It is therefore preferred to use the same ion thruster and only invert the direction of thrust, in order to keep tract of the same course of movement, which is easier in terms of navigation calculations. The use of the same ion thruster that can operate in two directions according to the invention is a simple and practical way to control the vehicle velocity (in space or on the road), and make it unnecessary to use other means, such as: brakes, the use of another ion thruster placed at an opposite direction, parachutes, changing the position of wings of a shuttle, and so on.

Pistons 42 move to change the conic direction of discharge chamber 34, and as the conic orientation of discharge chamber 34 polarizes, ion thruster 10 may be operated to create thrust in the opposite direction.

According to another embodiment of the invention, two neutralizers 64 are placed on the two sides of ion thruster 10 in proximity with wider side 58 and contracted (or "narrow") side 60, for neutralizing the charge of ions at both openings 18 and 24 of discharge chamber 34, allowing activation of ion thruster 10 in both directions.

FIG. 4 is a schematic illustration of a cross-section of an ion thruster, according to another embodiment of the invention.

According to another embodiment of the invention, electrodes 50 inside discharge chamber 34 are shaped in the form of a propeller. Electrodes 50 are connected to a shaft at the axis of rotation of the propellers, enabling electrodes 50 to rotate around the axis. Accelerator electrode 16, 50 is shaped like propeller 50, with rotating blades capable of conveying gaseous molecules from the cavity of discharge chamber 34, through outflow opening 24 into the outer surrounding. Propeller accelerator electrode 50 is rotatable around an axis, thereby propelling outward from discharge chamber 34 ions 28 and neutral atoms 12. Accelerator electrode 16, 50 is shaped in a form of a propeller 50 coupled with an electric engine connected to a power supply, and by activating the electric engine, propeller accelerator electrode 50 rotates around its axis, to propel molecules and free atoms from discharge chamber 34.

According to another embodiment of the invention, discharge cathode 16, 50 is shaped in the form of a propeller 50. Propeller 50 is rotatable around an axis, to propel inwards to discharge chamber 34 the propellant. By rotating discharge cathode propeller 50, the propellant is compressed into discharge chamber 34, and increases the pressure inside the discharge chamber. Discharge cathode propeller 50 releases electrons 30 in discharge chamber 34 for ionizing the propellant in discharge chamber 34. The combined function of discharge cathode propeller 50 as both compressing—the propellant and releasing electrons 30 in discharge chamber 34 to ionize the propellant, gives the increased mass of the ions 28 inside discharge chamber 34. In this way, as the mass of ions 28 is increased inside discharge chamber 34, a much more powerful thrust is gained by accelerating ions 28 inside discharge chamber 34 in the direction towards outflow opening 24.

Gas cylinder 70 is filled with a propellant, and is connected to inflow opening 18. Door 72 enables the opening and closing of inflow opening 18 to allow opening or closing the propellant flow into discharge chamber 34. By controlling the flow of the propellant into discharge chamber 34, the pressure inside discharge chamber 34 can be controlled to produce a desired level of thrust.

Power source 22 is connected to electrodes 50 and to electromagnetic coils 26. Buttons 54 control the switching of electricity flow 48 into electromagnetic coils 26. As switch 56 is turned on, electricity 48 flows from power source 22 via the electric wires to electromagnetic coils 26. By the pushing of buttons 54 (as can be done automatically by a series of commands from a controlling operator computer), electromagnetic coils 26 are turned on to create an electromagnetic field inside discharge chamber 34. By alternately turning on and off electromagnetic coils 26 in a pattern of rhythmic cycles, an electromagnetic wave is formed. Such a pattern, for example, may be a cycle constructed from a series of electric pulses, such as " . . . A, B, C, A, B, C, A, B, C . . . ", where the characters "A", "B", and "C" stand for a certain electromagnetic coil 26, or for a certain area of coils. The electromagnetic waves propagated by the means of electromagnetic coils 26 further accelerate the motion of charged ions 28 towards the direction of outflow opening 24 to allow for the forceful exit of ions 28 from discharge chamber 34 to create powerful thrust. After charged ions 28 exit in this way from outflow opening 24, neutralizer 64 neutralizes the outflowing ions 28, by releasing negatively charged electrons 30 that conjugate with positively charged ions 28 to result in neutral atoms 12.

Figure 5:
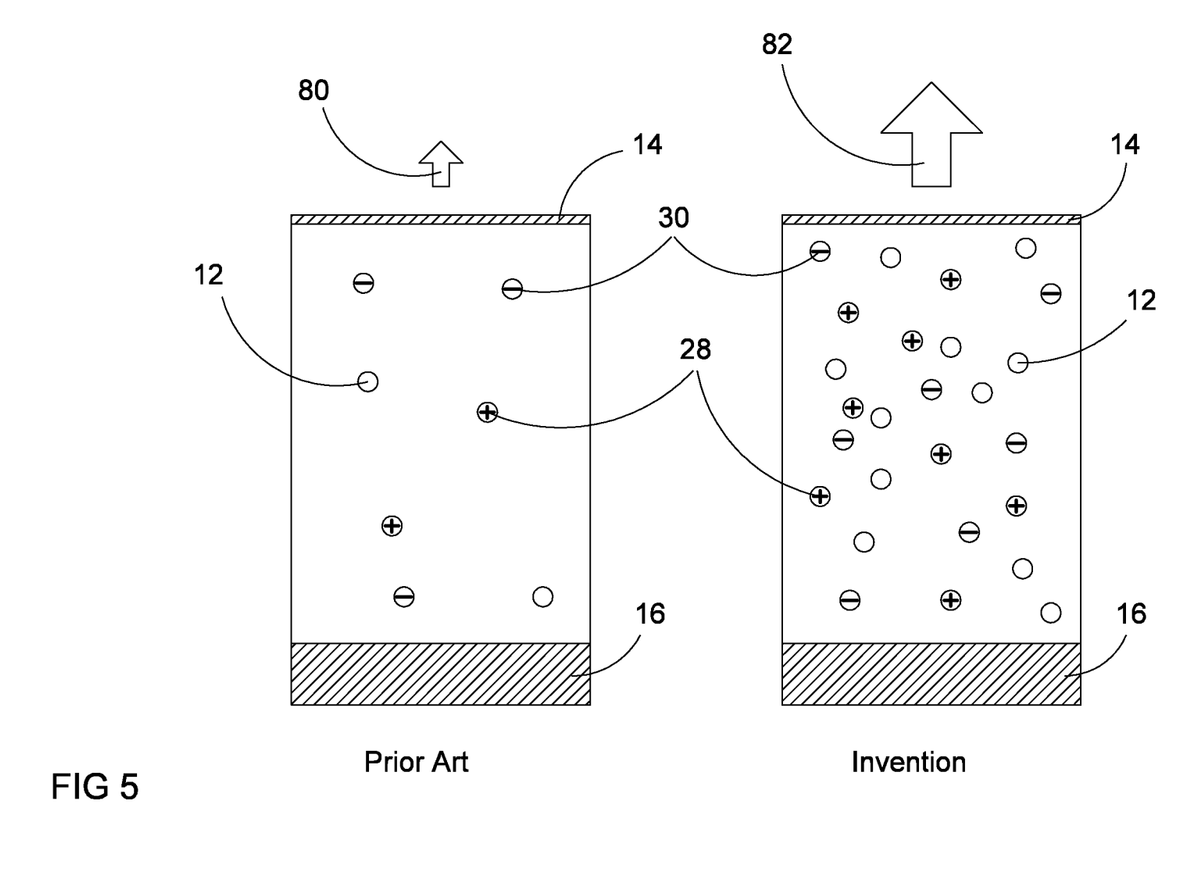
FIG. 5 is a schematic illustration comparing a prior art system to an ion thruster according to one embodiment of the invention.

FIG. 5 is a schematic illustration comparing a prior art system to an ion thruster, according to one embodiment of the invention.

According to this illustration, a prior art system is presented at the left side of FIG. 5 (named here as "Prior Art"), for a comparison with ion thruster 10 in accordance with one embodiment of the invention (named here as "Invention"). It is shown that ion thruster 10 in accordance with the invention has a much higher content of charged ions 28 in comparison with the prior art system. If the relation of the content of charged ions 28 inside discharge chamber 34 is 4:1 (in this simplified schematic example, eight positive ions are drawn in the "Invention" sketch, compared with two ions in the "Prior Art" sketch, therefore 8 divided by 2 equals a ratio of 4:1), then the ratio of the resulting thrust is also the ratio of 4:1 in favor of the "Invention" depiction of ion thruster 10. In this respect, arrow 82 representing the force acting upon the upwards direction in the "Invention" sketch, should be four times greater than the area of arrow 80 representing the force acting upon the upwards direction in the "Prior Art" sketch. If in the "Invention" scheme we have four times more ions 28 than in the "Prior Art" sketch, according to the formula "F=ma", the force ("F") resulting from four times the ions 28 mass ("4m"), would be four times greater (that is, "4F" in the "Invention" example). That is, according to the law of "F=ma", if we take the ions 28 mass inside discharge chamber 34 to be four times greater (given that all other measures stay the same), then the result would be equal to: "4F=4ma" (the resulting force being four times stronger because the mass of the ions is four times greater while the acceleration stays the same). In this example, the power of accelerator electrode 14 is the same as in both the "Prior Art" and the "Invention", and the difference stems from the increase in the mass of positive ions 28 in the "Invention" mode. The increase in the mass of ions 28 in the "Invention" mode (represented here by the right sketch in FIG. 5), may be the result of condensing more propellant into discharge chamber 34 of ion thruster 10. Because a propellant may be compressed into discharge chamber 34 by means of propeller electrodes 50 or with high pressure gas cylinder 70, then the pressure inside discharge chamber 34 can be increased to contain a greater mass of positive ions 28. (A greater mass of a propellant is to become a greater mass of ions 28, after the ionization of neutral atoms 12 by discharge cathode 16, 50, as shown in FIGS. 2, 4, and 5).

The high level of ions flow 82, which is equal to a greater force in the "Invention", is translated to the greater thrust in the "Invention", when compared with the force produced in the "Prior Art" (represented by the low level of ions flow 80). The greater density of positive ions 28 in discharge chamber 34 of the "Invention" mode, is responsible for the greater force in the "Invention" and therefore to the preferable thrust, according to one embodiment of the invention.

Figure 6:
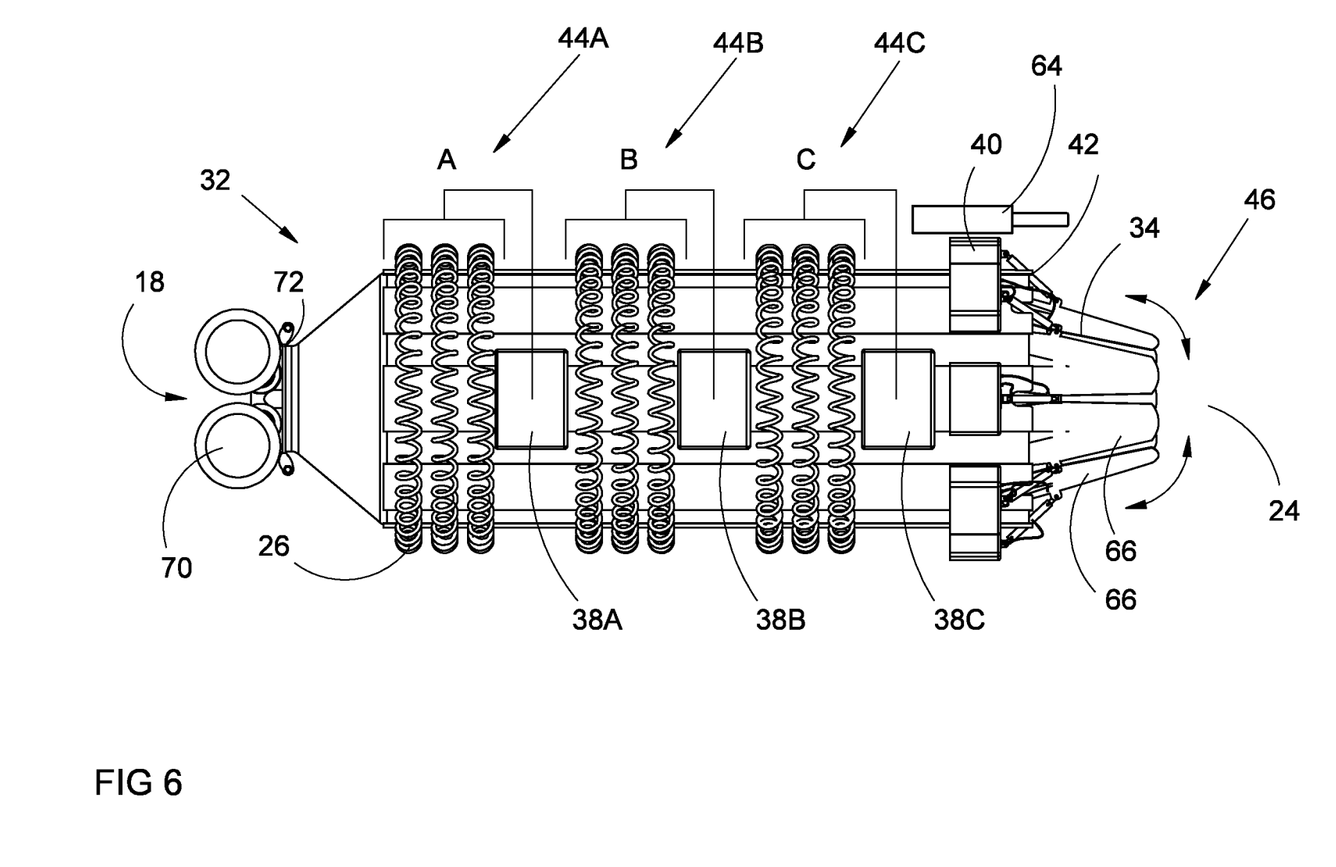
FIG. 6 is a schematic illustration of an ion thruster according to another embodiment of the invention.

FIG. 6 is a schematic illustration of an ion thruster according to another embodiment of the invention.

According to this embodiment of the invention, ion thruster 10 is coated with electromagnetic coils 26, divided into three sections: A, B, and C.

Each of the three sections of electromagnetic coils 26, A, B, and C, may be activated separately, independent of the other sections. Coils controllers 38A, 38B, and 38C are connected to coils sections 44A, 44B, and 44C, respectively. By switching the activation of coils sections 44A, 44B, and 44C, electromagnetic coils 26 propagate an electromagnetic wave in charged ions 28 that are inside discharge chamber 34. In the presence of an electromagnetic wave propagated by the switching of coils sections 44A, 44B, and 44C, the acceleration of positively charged ions 28 in discharge chamber 34 is substantially increased. By activating coils controllers 38A, 38B, and 38C in a cycle, to activate coils sections 44A, 44B, and 44C, a continuous plasma wave is built inside discharge chamber 34 to increase ions 28 acceleration. As a result of the increase in the acceleration of ions 28 inside discharge chamber 34, the velocity of ions 28 also increases, with the outcome of an increased thrust of ion thruster 10, according to another embodiment of the invention.

By adding more sections to coils sections 44A, 44B, and 44C, more complex patterns of electromagnetic waves may be built inside discharge chamber 34, to further increase the acceleration of charged ions 28 inside discharge chamber 34. For example, by using five separated coils sections, an improved electromagnetic wave may be built inside discharge chamber 34 to further increase the acceleration of discharged ions 28.

Funnel 32 connects inflow opening 18 with discharge chamber 34, for allowing a facilitated movement of the propellant from gas cylinder 70 through door 72 into discharge chamber 34.

Hydraulic controller 40 is coupled with pistons 42 to change the position of conductive beams 66. By changing the position of conductive beams 66, conic angle 46 of outflow opening 24 is controlled. The change of angle 46 of conductive beams 66 changes the angle of the conic shape of discharge chamber 34 (and therefore also of outflow opening 24), thereby changing the velocity of charged ions 28 inside discharge chamber 34.

Figure 7:
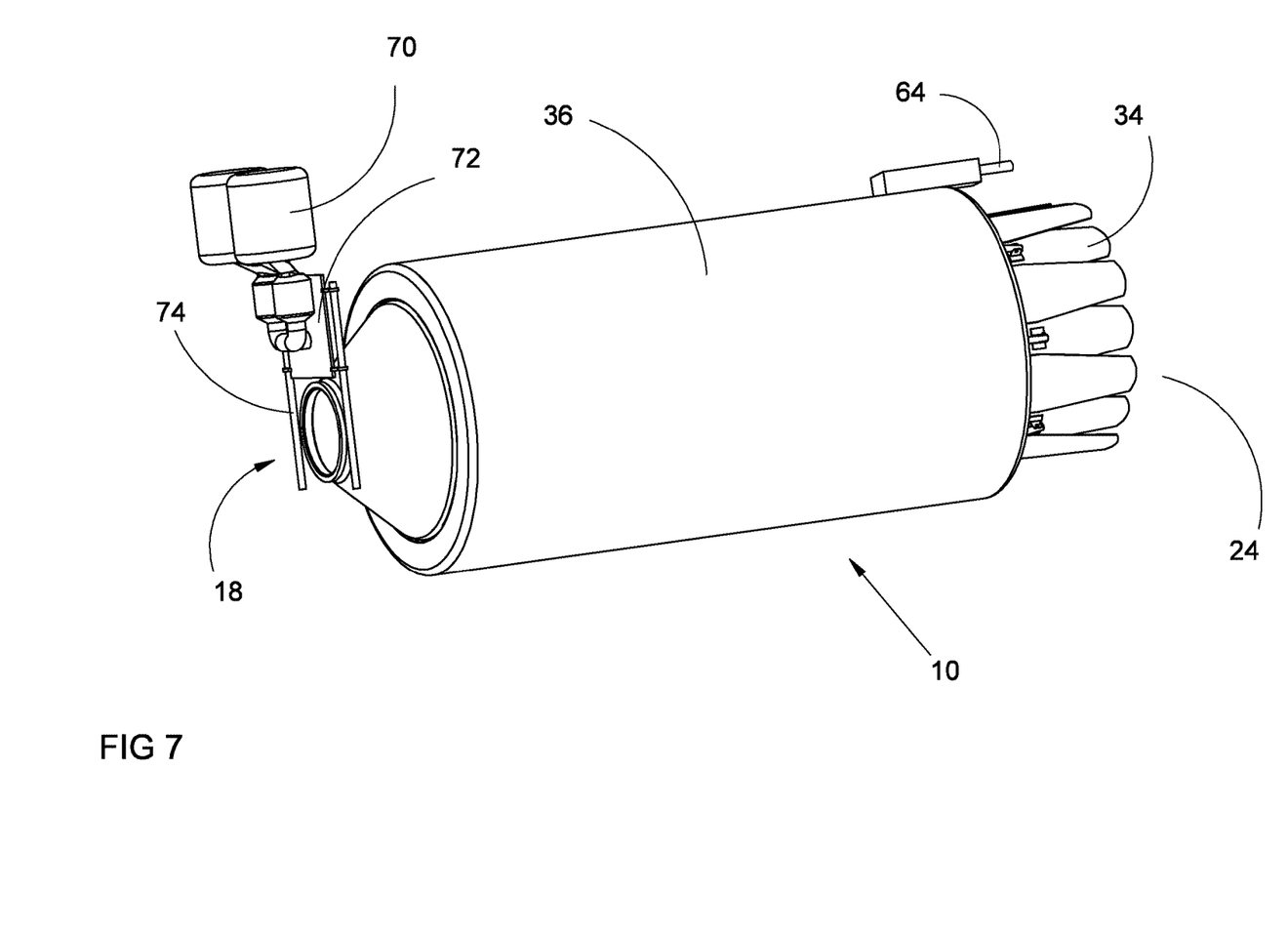
FIG. 7 is a schematic illustration of an ion thruster, according to another embodiment of the invention.

FIG. 7 is a schematic illustration of an ion thruster, according to another embodiment of the invention.

According to another embodiment of the invention, ion thruster 10 includes gas cylinders 70 connected to inflow opening 18 to allow a propellant to enter through door 72, installed on track 74, to control the flow of a propellant into inflow opening 18.

Neutralizer 64 is coupled to envelope 36 of ion thruster 10 for the release of electrons in the direction of outflow opening 24 of discharge chamber 34, to allow for the neutralization of the outflow of the charged ions.

Figure 8:
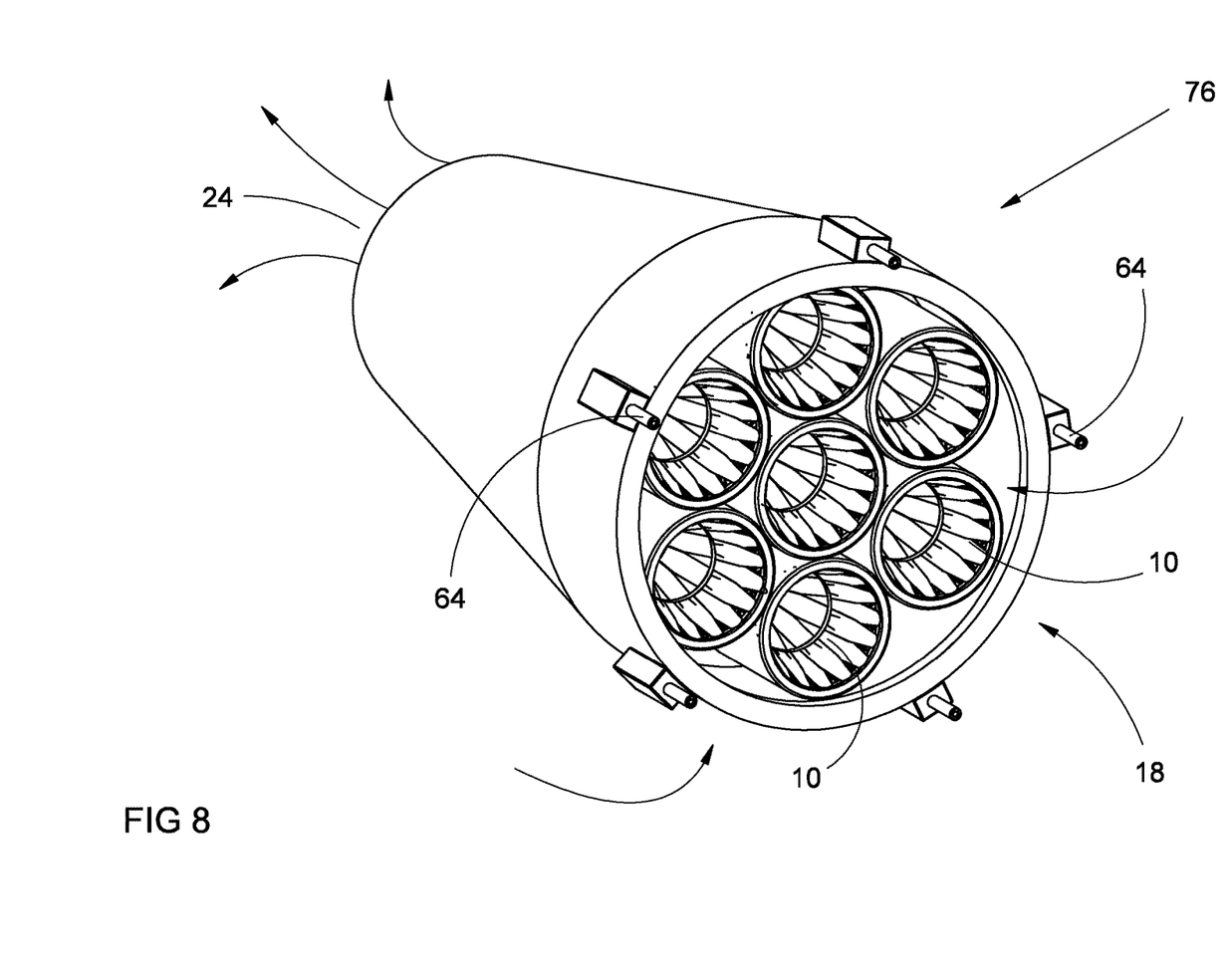
FIG. 8 is a schematic illustration of a plurality of ion thrusters enclosed in a compartment, according to another embodiment of the invention.

FIG. 8 is a schematic illustration of a plurality of ion thrusters enclosed in a compartment, according to another embodiment of the invention.

According to another embodiment of the invention, a plurality of ion thrusters 10 is enclosed in compartment 76, forming a cartridge of ion thrusters 10.

Compartment 76 encloses a plurality of ion thrusters 10 in accordance with another embodiment of the invention, to enable a significant increase in thrust power. In FIG. 8, for example, a set of seven ion thrusters 10 is disposed together for allowing the use of a stronger thrust power, to enable the propulsion of heavier vehicles.

Thus, in one aspect, the invention is directed to an ion thruster (10), comprising:

a discharge chamber (34) for accelerating ions (28) towards one direction;

an inflow opening (18) for intake of a propellant into the discharge chamber (34);

a discharge cathode (16, 50), shaped in a form of a propeller, for releasing electrons (30) in the discharge chamber (34), thereby ionizing the propellant in the discharge chamber (34), wherein the discharge cathode (16, 50) is rotatable around an axis, thereby propelling inward to the discharge chamber (34) the propellant thereof;

an outflow opening (24) for exhausting the ions (28) from the discharge chamber (34); and an accelerator electrode (16, 50), shaped in a form of a propeller, for accelerating the ions (28) towards the one direction of the outflow opening (24), wherein the accelerator electrode (16, 50) is rotatable around an axis, thereby propelling outward from the discharge chamber (34) the ions (28) and neutral atoms thereof;

wherein the ion thruster (10) comprises electromagnetic coils (26) for generating a magnetic field inside the discharge chamber (34), wherein the electromagnetic coils (26) are wound around the discharge chamber (34), thereby the electromagnetic coils (26) enhance the degree of ionization and increase the acceleration rate of the ions (28) inside the discharge chamber (34) thereof;

thereby accelerating the ions (28) inside the discharge chamber (34) for creating a thrust.

The ion thruster may be operated within the earth's atmosphere.

The propellant may be atmospheric air.

The ion thruster (10) may be coupled to a vehicle selected from the group consisting of: a car, a motorcycle, and a boat; thereby the ion thruster (10) moves the vehicle.

The propellant may be selected from the group consisting of: xenon, argon, hydrogen, ammonia, nitrogen, and bismuth.

The ion thruster may comprise at least one neutralizer (64), wherein the at least one neutralizer (64) releases electrons (30) to the outside surrounding of the outflow opening (24), thereby neutralizing the ions (28) exhausting from the discharge chamber (34) thereof.

The electromagnetic coils (26) may be partitioned into coils sections (44A, 44B, 44C);
wherein the coils sections (44A, 44B, 44C) are coupled with coils controllers (38A, 38B, 38C);
wherein the switching of the coils controllers (38A, 38B, 38C) activates the coils sections (44A, 44B, 44C);
thereby the electromagnetic coils (26) propagate electromagnetic waves inside the discharge chamber (34).

In another aspect, the invention is directed to an ion thruster (10) coupled to a vehicle, comprising:
a discharge chamber (34) in a shape of a cone, for accelerating ions (28) in the direction towards the narrow side of the cone;
an inflow opening (18) at the wide side of the cone for intake of a propellant into the discharge chamber (34);
a discharge cathode (16, 50) releasing electrons (30) in the discharge chamber (34); thereby ionizing the propellant in the discharge chamber (34);
an outflow opening (24) at the narrow side of the cone for exhausting the ions (28) from the discharge chamber (34); and
an accelerator electrode (14, 16, 50), for accelerating the ions (28) in the direction of the narrow side of the cone;
thereby accelerating the ions (28) inside the discharge chamber (34) towards the direction of the outflow opening (24) at the narrow side of the cone, by intake of the propellant from the inflow opening (18) into the discharge chamber (34);
thereby creating a thrust towards the direction of the inflow opening (18) at the wide side of the cone, thereby moving the vehicle.

The propellant may be selected from the group consisting of: xenon, argon, hydrogen, ammonia, nitrogen, bismuth, and air.

The intake of the propellant into the discharge chamber (34) from the inflow opening (18) may be at a relatively high pressure, thereby forming a substantially higher pressure inside the discharge chamber (34) than the normal atmospheric pressure.

The vehicle may be selected from the group consisting of: a spacecraft, a satellite, a car, a motorcycle, and a boat.

The accelerator electrode (14, 16, 50) may be shaped in a form of a propeller, wherein the propeller is rotatable around an axis, thereby propelling outward from the discharge chamber (34) the ions (28) and neutral atoms (12) thereof.

The discharge cathode (16, 50) may be shaped in a form of a propeller, wherein the propeller is rotatable around an axis, thereby propelling inward to the discharge chamber (34) the propellant thereof.

The ion thruster (10) may comprise electromagnetic coils (26) for generating a magnetic field inside the discharge chamber (34), thereby enhancing the degree of ionization and increasing the acceleration rate of the ions (28) inside the discharge chamber (34) thereof.

The electromagnetic coils (26) may be wound around the discharge chamber (34), thereby substantially increasing the acceleration of the ions (28) therewith propagating an electromagnetic wave thereinto the ions (28) inside the discharge chamber (34).

The ion thruster may comprise at least one neutralizer (64), wherein the at least one neutralizer (64) releases electrons (30) to the outside surrounding of the outflow opening (24), thereby neutralizing the ions (28) exhausting from the discharge chamber (34) thereof.

The ion thruster may comprise electromagnetic coils (26) partitioned into separated coils sections (44A, 44B, 44C), wherein the coils sections (44A, 44B, 44C) are coupled with coils controllers (38A, 38B, 38C);
wherein the switching of the coils controllers (38A, 38B, 38C) activates the coils sections (44A, 44B, 44C);
thereby the electromagnetic coils (26) propagate electromagnetic waves in the discharge chamber (34).

The shape of a cone of the discharge chamber (34) may be adjustable to allow the widening and the narrowing of the inflow opening (18) and of the outflow opening (24).

By widening the outflow opening (24) and narrowing the inflow opening (18), the shape of the cone of the discharge chamber (34) may be inverted into the shape of a cone with an orientation to the opposite direction;
thereby the discharge chamber (34) changes a direction of operation therewith the opposite orientation, thereabout the ion thruster (10) creates thrust towards the opposite direction.

In the figures and/or description herein, the following reference numerals (Reference Signs List) have been mentioned:
numeral 10 denotes an ion thruster;
numeral 12 denotes a free gas neutral atom;
numeral 14 denotes an accelerator electrode;
numeral 16 denotes an electrode;
numeral 18 denotes an inflow opening for intake of a propellant;
numeral 22 denotes a power source;
numeral 24 denotes an outflow opening for the exhaust of accelerated ions;
numeral 26 denotes electromagnetic coils;
numeral 28 denotes positively charged ions;
numeral 30 denotes electrons;
numeral 32 denotes a funnel;
numeral 34 denotes a discharge chamber;
numeral 36 denotes an envelope;
numerals 38A, 38B, and 38C denote electromagnetic coils (26) controllers;
numeral 40 denotes a hydraulic controller;
numeral 42 denotes a piston;
numerals 44A, 44B, and 44C denote electromagnetic coils (26) sections;
numeral 46 denotes a conic angle;
numeral 48 denotes electricity flow;
numeral 50 denotes an electrode shaped in a form of a propeller;
numeral 52 denotes a ring;
numeral 54 denotes a button;
numeral 56 denotes a switch;
numeral 58 denotes a wider side of an ion thruster;
numeral 60 denotes a contracted side of an ion thruster;
numeral 62 denotes a control;
numeral 64 denotes a neutralizer;
numeral 66 denotes a conductive beam;
numeral 70 denotes a gas cylinder filled with a propellant;
numeral 72 denotes a door;
numeral 74 denotes a track of a door (72);
numeral 76 denotes a compartment enclosing a plurality of ion thrusters (10);
numeral 80 denotes a low level of ions (28) flow; and
numeral 82 denotes a high level of ions (28) flow.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. An ion thruster, comprising:
   a discharge chamber for accelerating ions towards one direction;
   an inflow opening for intake of a propellant into said discharge chamber;
   a propeller shaped discharge cathode with rotating blades, for releasing electrons
   in said discharge chamber, thereby ionizing said propellant in said discharge chamber, wherein said propeller shaped discharge cathode is rotatable around a first axis, thereby propelling inward to said discharge chamber said propellant;
   an outflow opening for exhaust of said ions from said discharge chamber; and
      a propeller shaped accelerator electrode with rotating blades, for accelerating said ions in said one direction towards said outflow opening, wherein said propeller shaped accelerator electrode is rotatable around a second axis, thereby propelling outwardly from said discharge chamber said ions and neutral atoms;
      electromagnetic coils for generating a magnetic field inside said discharge chamber, wherein said electromagnetic coils are wound around said discharge chamber, said electromagnetic coils thereby enhancing a degree of ionization and increasing an acceleration rate of said ions inside said discharge chamber;
      thereby accelerating said ions inside said discharge chamber for creating a thrust.

2. The ion thruster according to claim 1, wherein said ion thruster is configured for operation within an atmosphere.

3. The ion thruster according to claim 2, wherein said propellant is atmospheric air.

4. The ion thruster according to claim 2, wherein said ion thruster is coupled to a vehicle selected from the group consisting of: a car, a motorcycle, and a boat and is configured to move said vehicle.

5. The ion thruster according to claim 1, wherein said propellant is selected from the group consisting of: xenon, argon, hydrogen, ammonia, nitrogen, and bismuth.

6. The ion thruster according to claim 1, further comprising at least one neutralizer, wherein said at least one neutralizer releases electrons to an outside surrounding of said outflow opening, thereby neutralizing said ions exhausting from said discharge chamber.

7. The ion thruster according to claim 1, wherein said electromagnetic coils are partitioned into coils sections;
   wherein said coils sections are coupled with coils controllers;
   wherein a switching of said coils controllers activates said coils sections;
   wherein said electromagnetic coils propagate electromagnetic waves inside said discharge chamber.

8. An ion thruster coupled to a vehicle, comprising:
   a cone shaped discharge chamber, for accelerating ions in a direction towards a narrow side of said cone shaped discharge chamber;
   an inflow opening at a wide side of said cone shaped discharge chamber for intake of a propellant into said cone shaped discharge chamber;
   a discharge cathode releasing electrons in said cone shaped discharge chamber; thereby ionizing said propellant in said cone shaped discharge chamber;
   an outflow opening at said narrow side of said cone shaped discharge chamber for exhaust said ions from said cone shaped discharge chamber; and
   an accelerator electrode, for accelerating said ions in said direction towards said narrow side of said cone shaped discharge chamber, wherein said accelerator electrode is rotatable around an axis relative to the cone shaped discharge chamber for propelling outward from said cone shaped discharge chamber said ions and neutral atoms;
   said ion thruster being configured to intake said propellant from said inflow opening into said cone shaped discharge chamber and to accelerate said ions inside said cone shaped discharge chamber in said direction;
   thereby creating a thrust in the direction, thereby moving said vehicle.

9. The ion thruster according to claim 8, wherein said discharge cathode is rotatable around an axis relative to the cone shaped discharge chamber, thereby propelling inward to said cone shaped discharge chamber said propellant.

10. The ion thruster according to claim 8, wherein cone shaped discharge chamber is adjustable to allow the widening and the narrowing of said inflow opening and of said outflow opening.

11. The ion thruster according to claim 10, wherein by widening said outflow opening and by narrowing said inflow opening, said cone shaped discharge chamber is inverted into of a cone with an opposite;
   said cone shaped discharge chamber being configured to create thrust opposite the direction.

* * * * *